(12) United States Patent
Corboy et al.

(10) Patent No.: US 7,552,172 B2
(45) Date of Patent: *Jun. 23, 2009

(54) MULTI-WINDOWED ONLINE APPLICATION ENVIRONMENT

(75) Inventors: David Corboy, Potomac Falls, VA (US); John Marshall, Napa, CA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/856,486

(22) Filed: Sep. 17, 2007

(65) Prior Publication Data

US 2008/0065723 A1     Mar. 13, 2008

Related U.S. Application Data

(63) Continuation of application No. 09/842,796, filed on Apr. 27, 2001, now Pat. No. 7,277,912.

(60) Provisional application No. 60/200,104, filed on Apr. 27, 2000.

(51) Int. Cl.
    *G06F 15/16* (2006.01)
(52) U.S. Cl. .................. 709/203; 709/217; 715/773; 715/802
(58) Field of Classification Search .......... 709/203, 709/206, 217, 218, 219; 715/738, 771, 778, 715/781, 792, 802, 804, 805, 501.1, 513; 345/738, 771, 778, 781, 792, 802, 804, 805
See application file for complete search history.

(56) References Cited

U.S. PATENT DOCUMENTS

| | | |
|---|---|---|
| 5,345,551 A | 9/1994 | Shelley et al. |
| 5,826,242 A | 10/1998 | Montulli |
| 5,859,972 A | 1/1999 | Subramaniam et al. |
| 5,864,852 A | 1/1999 | Luotonen |
| 5,864,874 A | 1/1999 | Shapiro |
| 6,101,510 A | 8/2000 | Stone et al. |
| 6,272,493 B1 | 8/2001 | Pasquali |
| 6,321,209 B1 | 11/2001 | Pasquali |
| 6,397,264 B1 | 5/2002 | Stasnick et al. |
| 6,560,707 B2 | 5/2003 | Curtis et al. |
| 6,678,719 B1 | 1/2004 | Stimmel |
| 6,708,172 B1 | 3/2004 | Wong et al. |
| 6,772,335 B2 | 8/2004 | Curtis et al. |
| 6,785,708 B1 | 8/2004 | Busey et al. |

*Primary Examiner*—Lashonda T Jacobs
(74) *Attorney, Agent, or Firm*—Fish & Richardson P.C.

(57) ABSTRACT

Systems and techniques for transferring electronic data to a user of a communications system by establishing a connection between a client and a host; receiving electronic data from the host in response to a data request transmitted from the client; and at the client, simultaneously executing multiple instantiations of the browser application in response to the electronic data received from the host. The client includes a browser application configured to render data encapsulated in a standard Internet content format. Each instantiation of the browser application is configured to exchange messages with at least one other instantiation of the browser application.

37 Claims, 10 Drawing Sheets

MULTI-WINDOWED ONLINE APPLICATION ENVIRONMENT

CROSS-REFERENCE TO RELATED APPLICATIONS

This application is a continuation application of and claims priority to U.S. application Ser. No. 09/842,796, filed on Apr. 27, 2001, which claims the benefit of U.S. Provisional Application No. 60/200,104, filed Apr. 27, 2000, which is incorporated by reference.

TECHNICAL FIELD

The present invention relates generally to providing online services. More specifically, the present invention relates to a multi-windowed online application environment for providing online services.

BACKGROUND

A browser is a client software application that enables a user to access and view electronic content stored either locally or remotely, such as in a network environment (e.g., local area network (LAN), intranet, Internet). A browser typically is used for displaying documents described in Hyper-Text Markup Language ("HTML") and stored on servers connected to a network such as the Internet.

A user instructs a browser to access an HTML document, or web page, by specifying a network address or Uniform Resource Locator ("URL"), at which a desired document resides. In response, the browser contacts the corresponding server hosting the requested web page, retrieves the one or more files that make up the web page, and then displays the web page in a window on the user's computer screen.

Even though a user can navigate the Web by typing addresses and/or clicking URLs, the size and disorganization of the Internet often makes finding meaningful or desired content difficult. Web pages are designed to simply present information to users rather than to promote interaction between users and/or within the browser application. That is, there is no interconnection, communication, or exchange of information between web pages when rendered by a browser since a Web browser simply interprets the HTML document located at a particular URL. While Web pages often may contain links to other web pages, images, audio files or video files, there is no exchange of information between instantiations of the browser application. Conventional Internet Service Providers (ISPs) allow subscribers to connect to the Internet, but, in general, do not facilitate a user's online experience.

In contrast, online service providers ("OSPs") such as America Online or CompuServe are constantly are offering new services and upgrading existing services to enhance their subscribers' online experience. Subscribers have on-demand access to news, weather, financial, sports, and entertainment services as well as the ability to transmit electronic messages and to participate in online discussion groups. For example, subscribers of OSPs may view and retrieve information on a wide variety of topics from servers located throughout the world.

OSP subscribers have received the benefit of enhanced online experiences due in part to the fact that OSPs facilitate interactions between the subscriber's computer and the online service provider using a variety of software protocols (i.e., communication conventions, rules, and structures), including application level protocols, for managing the transfer of data across the network and to the client application on the subscriber's computer. For example, OSP client applications promote interaction and information sharing between frames presented by the service in order to provide subscribers with a unique online experience unattainable by conventional ISPs.

SUMMARY

In one general aspect, electronic data is transferred to a user of a communications system by establishing a connection between a client and a host, receiving electronic data from the host in response to a data request transmitted from the client, and, at the client, simultaneously executing multiple instantiations of the browser application in response to the electronic data received from the host. The client includes a browser application configured to render data encapsulated in a standard Internet content format. Each instantiation of the browser application is configured to exchange messages with at least one other instantiation of the browser application. The data request may be transmitted using an OSP client application and/or a browser application. The browser application may be embedded within an OSP client application.

Implementations may include one or more of the following features. For example, a first graphical user interface maybe rendered within a first instantiation of the browser and a second graphical user interface may be rendered in a second instantiation of the browser. The first instantiation of the browser may include a welcome screen, a toolbar, an electronic mail window, an instant messaging window, and/or a search window.

A communication pathway may be established between multiple instantiations of the browser application by executing coordinating code in each instantiation of the browser. The coordinating code may include standard Internet content format, such as, for example HTML, CSS, and Java Script. The first instantiation of the browser may establish and/or control a communications session. The second instantiation of the browser application may display content associated with the session.

In another general aspect, electronic data is transferred to users of a communications system by establishing a connection between a client and a host, the client including a browser application configured to render data encapsulated in a standard Internet content format; and transmitting electronic data from the host in response to a data request received from the client. The electronic data includes instructions for simultaneously executing multiple instantiations of the browser application, each instantiation of the browser application being configured to exchange messages with at least one other instantiation of the browser application.

The described techniques include an integrated method of interaction that allows computer users to access the Internet/Web using a browser and also to enjoy the quality of services afforded by online service providers that typically could be accomplished only by leaving the Web browser and switching to the online service content/online service communications software.

Advantages include the ability to provide substantially better services in terms of authentication, session management, and parental controls. For example, member services may be furnished, as well as regulation and moderation of online activity. In addition, subscribers may be provided with content that is far richer and more graphical than typical Web pages.

Other features and advantages will be apparent from the following description, including the drawings, and from the claims.

DETAILED DESCRIPTION

For illustrative purposes, FIGS. 1-5 describe a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
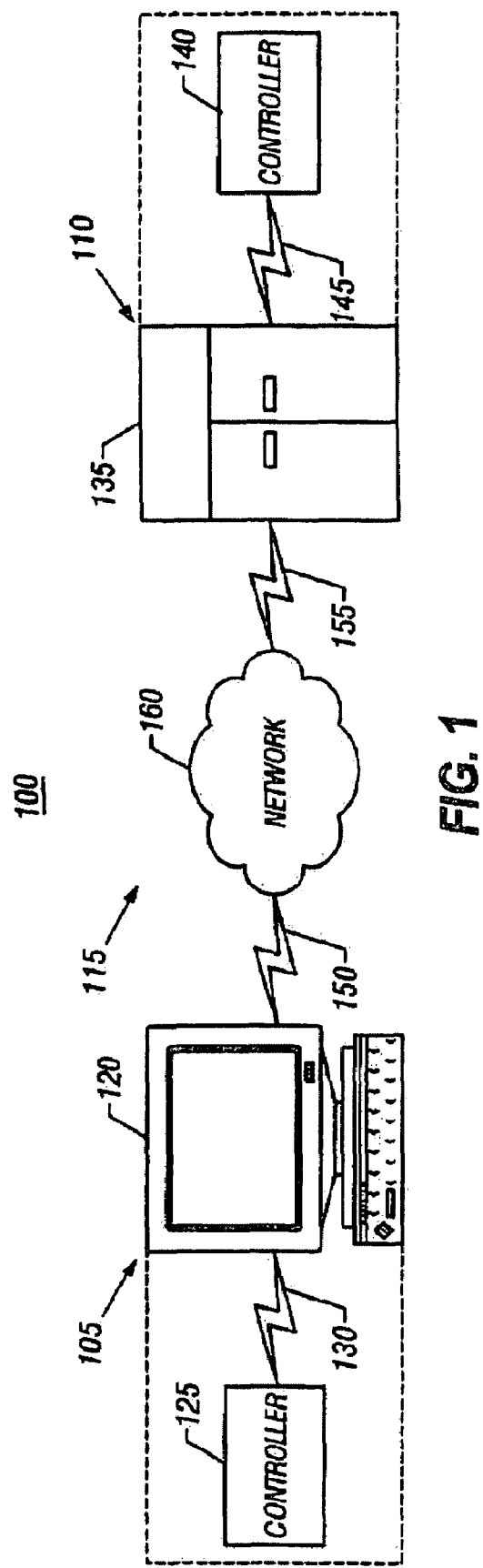
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

The client device 120 is generally capable of executing instructions under the command of a client controller 125. The client device 120 is connected to the client controller 125 by a wired or wireless data pathway 130 capable of delivering data.

The client device 120 and client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of client controller 125 is a software application loaded on the client device 120 for commanding and directing communications enabled by the client device 120. Other examples include a program, a piece of code, an instruction, a device, a computer, a computer system, or a combination thereof, for independently or collectively instructing the client device 120 to interact and operate as described herein. The client controller 125 may be embodied permanently or temporarily in any type of machine, component, equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, or xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
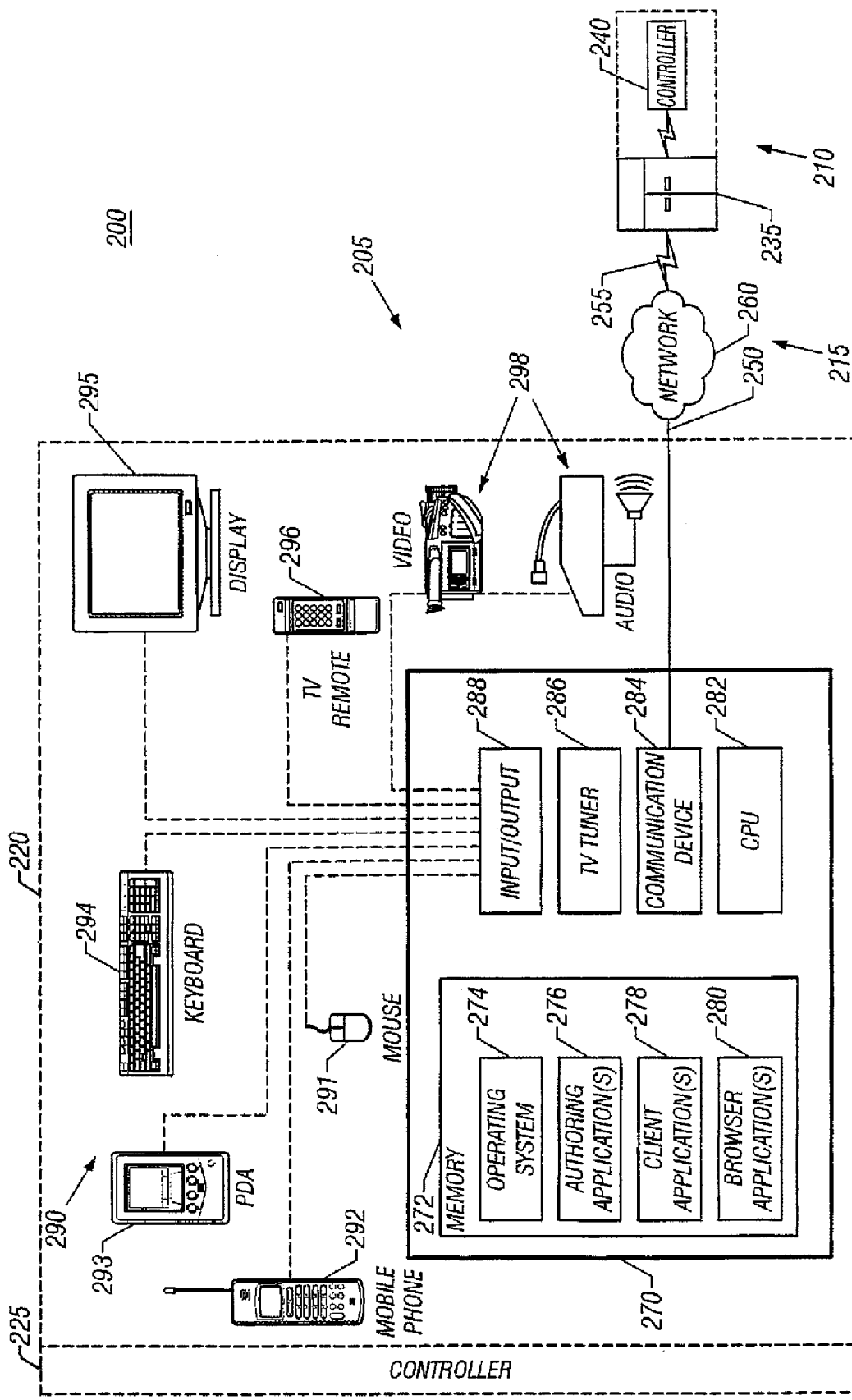
FIGS. 2-5 are block diagrams of expansions of aspects of the system of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, a TV remote control. 296 for receiving information from and rendering information to subscribers, and a audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
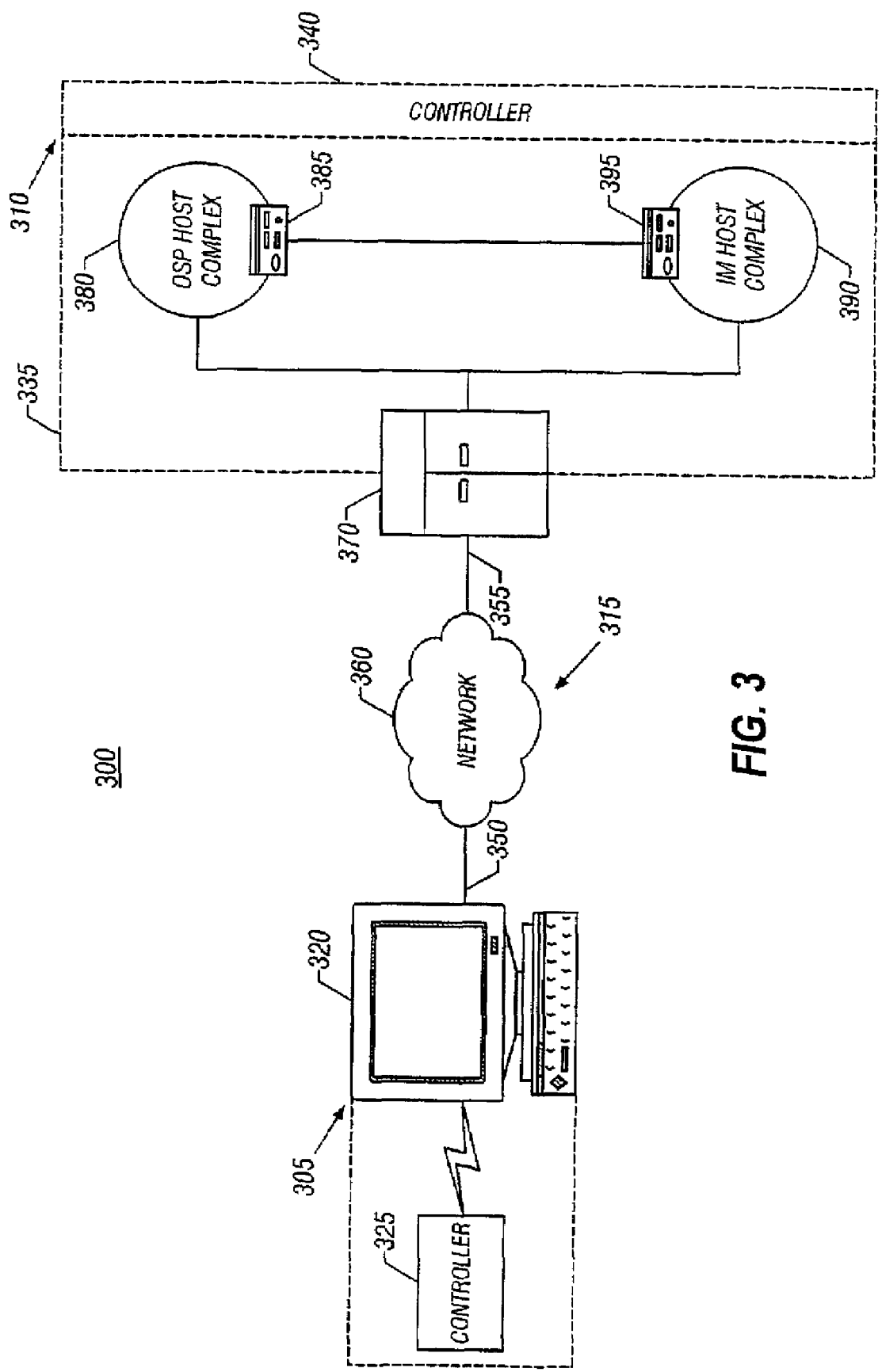

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
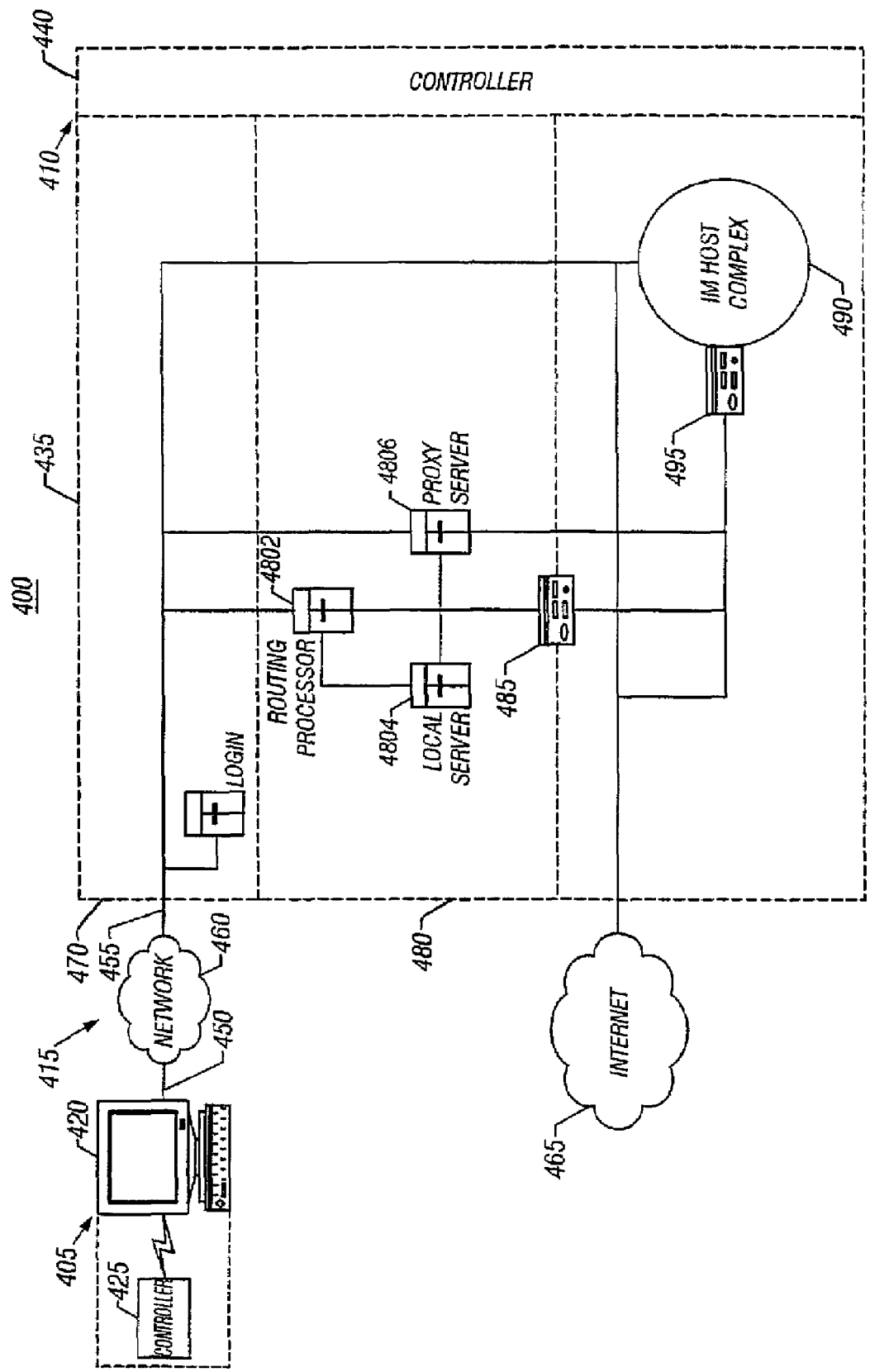

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible embodiment of the host systems 110, 210, and 310 shown in FIGS. 1-3, respectively. However, FIG. 4 describes an aspect of the host system 410, focusing primarily on one particular implementation of OSP host complex 480. For purposes of communicating with an OSP host complex 480, the delivery network 460 is generally a telephone network.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communication between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In the implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465 through. The proxy server 4802 may include an IP ("Internet Protocol") tunnel for converting data from OSP protocol into standard Internet protocol and transmitting the data to the Internet 465. The IP tunnel also converts data received from the Internet in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include a L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
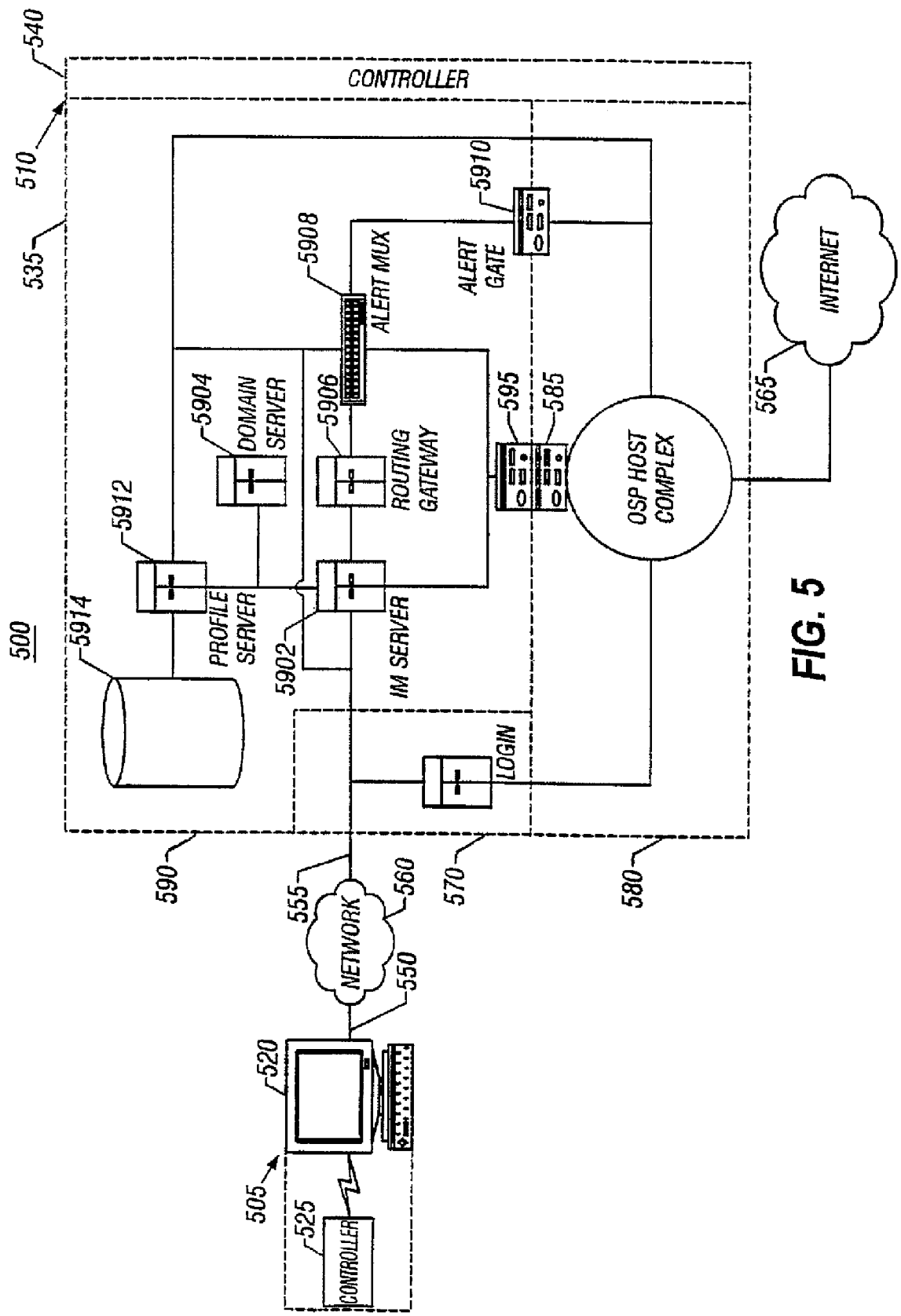

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible embodiment of the host systems 110, 210, 310, and 410 shown in FIGS. 1-4, respectively. However, FIG. 5 describes an aspect of the host system 510, focusing primarily on one particular implementation of IM host complex 590. For purposes of communicating with the IM host complex 590, the delivery network 560 is generally a telephone network.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers to several alert multiplexors. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 maybe used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
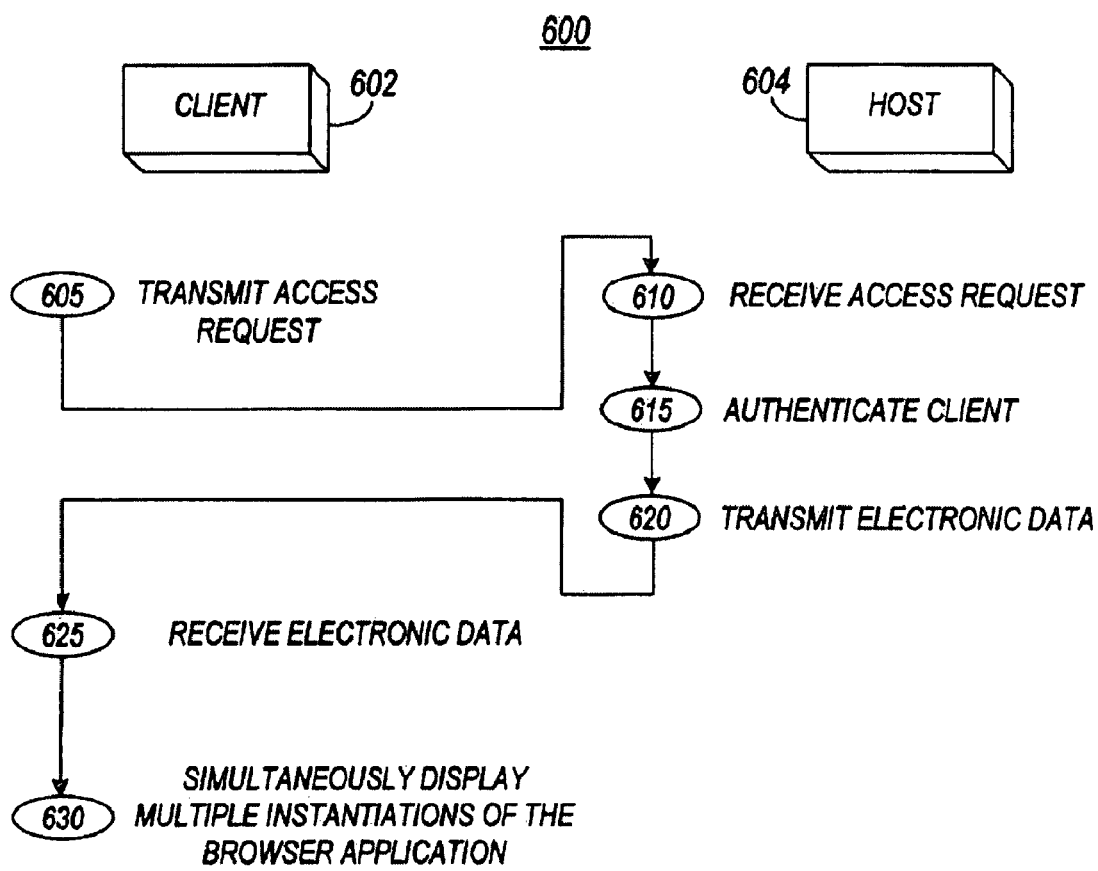
FIGS. 6 and 7 are flowcharts of communications methods that may be implemented by the system of FIG. 1.
Figure 7:
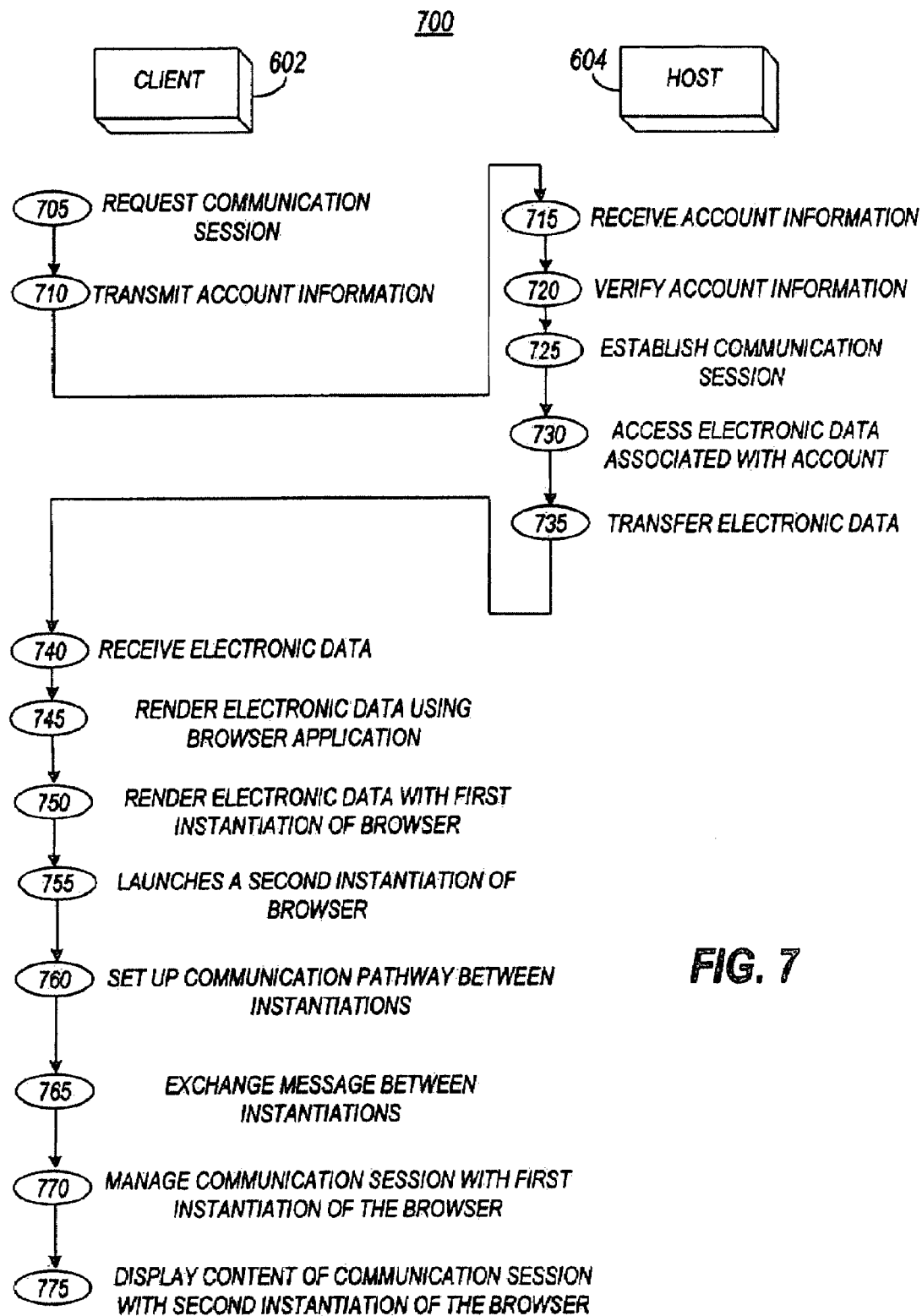

Referring to FIGS. 6 and 7, a client 602 and a host 604 interact according to procedures 600 and 700 to transfer electronic data between a client 602 and a host 604. The procedures 600 and 700 may be implemented by any type of hardware, software, device, computer, computer system, equipment, component, program, application, code, storage medium, or propagated signal.

Examples of elements that implement the procedure of FIG. 6 are broadly described above with respect to FIGS. 1-5. In particular, client 602 typically has attributes comparable to those described with respect to client devices 120, 220, 320, 420, and 520 and/or client controllers 125, 225, 325, 425, and 525. The host 604 typically has attributes comparable to those described above with respect to host devices 135, 235, 335, 435, and 535 and/or host controllers 140, 240, 340, 440, and 540. The client 602 and the host 604 may be directly or indirectly interconnected through a known or described delivery network.

The procedure 600 of FIG. 6 generally pertains to an online application environment that is supported by a browser. In one implementation, the client 602 includes a browser application (e.g., Netscape's Navigator or Microsoft's Internet Explorer) capable of rendering standard Internet content. Standard Internet content includes data encapsulated in a standard Internet content format such as HTML, CSS, DOM and Java Script. Standard Internet content formats, however, may include any other or later developed format, protocol, or similar construct with a published specification that has undergone formal public review and/or has been widely deployed as a dominant format for a particular solution space. The client 602 also may include an OSP client application that provides access to online services (e.g., Internet access, e-mail, instant messaging, interactive television, chat, interest groups, news services) offered by the OSP.

Initially, the client 602 transmits an access request to the host 604 (step 605). In one implementation, the client 602 requests access from a login server. An access request from the client 602 may take many forms. For instance, an access request may be the initial communication from the client 602 to the host 604 or may be included in a subsequent communication between the client 602 and the host 604. An access request also may be a request for access to an OSP host complex, a request for information, or any other communication with the host 604 after access is gained.

The host 604 receives the access request (step 610) and, in response, authenticates the client 602 (step 615). The host may authenticate the client 602, for example, by requiring the user to supply a valid screen name and password. After authenticating the client 602 (step 615), the host 604 transmits electronic data to the client 602 (step 620). The client 602 receives the electronic data from the host 604 (step 625) and, in response, simultaneously executes multiple instantiations of the browser application (step 630). Each of the multiple instantiations of the browser application is configured to exchange messages with at least one other instantiation of the browser application.

An instantiation of the browser application is a separate opening, execution, or running of the browser. Each instantiation of the browser application may be tailored to provide a specific online service. As such, one instantiation of the browser application may include more or less functionality or software applications relative to another instantiation.

Referring to FIG. 7, a client 602 and a host 604 interact using a first instantiation of a browser application and a second instantiation of the browser application. The procedure 700 generally pertains to an application environment having multiple instantiations of a browser application in tight communication with each other. In one implementation, the Application Programming Interface ("API") of a browser application to provide multi-windowed applications rather than single-Windowed applications.

According to the procedure 700, the client 602 requests a communication session with the host 604 (step 705). The first communication session may be initiated manually by the user and/or automatically according to the user's electronic data access preferences. In one implementation, a communications session includes a physical connection between the client 602 and the host 604, as well as, a session connection between the client 602 and the host 604. In general a communication session involves monitoring, managing, and/or otherwise providing online services associated with a particular account. The account may, for example, correspond to one or more individual subscribers of an OSP. Electronic data representing the online services is provided to the client of the subscriber over the physical connection.

The client 602 may request the communication sessions, for example, by transmitting account information (e.g., screen name, password, and preferences) to the host 604 (step 710). The host 604 receives the account information (step 715) verifies that the account information corresponds to a user of the online service (step 720), and establishes a communication session (step 725).

After establishing the communication session (step 725), the host 604 accesses electronic data associated with the account of the user (step 730). In general, access will be performed in accordance with the subscriber's electronic data access preferences. The host 604 may access electronic data from other parts of the host complex and/or the client 602.

After accessing the designated electronic data associated with the account (step 730), the host 604 transfers the electronic data to the designated destinations (step 735). In one implementation, the host 604 provides online services to the client 602 such as, for example, instant messaging, e-mail, and newsgroup access, and/or message board access.

The client 602 receives electronic data from the host 604 (step 740) and renders the electronic data using the browser application (step 745). In one implementation, the electronic data is rendered by a first instantiation of the browser application (step 750). The first instantiation of the browser may include, for example, displaying a first graphical user interface on the client 602. Different types of graphical user interfaces that may be displayed include, but are not limited to, a welcome screen window, a toolbar window, an electronic mail window, an instant messaging window, and a search window.

The first instantiation of the browser launches a second instantiation of the browser application (step 755). The second instantiation of the browser may include, for example, displaying a second graphical user interface on the client 602. In one implementation, multiple graphical user interfaces are displayed at the same time on the client 602. The graphical user interfaces may be separate windows or frames presented to a user on a display screen.

The first instantiation and the second instantiation of the browser application set up a communication pathway (step 760) and communicate with each other by exchanging messages (step 765). Such messages may include, for example, state information, session content, and communications parameters for maintaining a connection between instantiations of the browser application. In one implementation, coordinating codes is embedded into the electronic code rendered by the browser application. The coordinating code may include standard Internet content format (e.g. Java Script), which when rendered by a browser application, sets up a communication pathway between instantiations of the browser application and/or graphical user interfaces (e.g., windows). Messages are communicated between the instantiations of the browser applications through the communication pathway.

The first instantiation of the browser application manages the communication session with the host 604 (step 770), and the second instantiation of the browser application displays content of the communications session (step 775). In one implementation, the first instantiation of the browser application communicates with the host 604 and runs an event loop that controls the communications session. The second instantiation of the browser application displays content of the communications session without directly interacting with the host 604. In this way, the first instantiation of the browser behaves as a client-based proxy to facilitate communication between the second instantiation of the browser and the host 604. This may be advantageous where the first instantiation of the browser application and the second instantiation of the browser application are dedicated to providing different types of online services. For example, the first instantiation of the browser application may be dedicated to communicating with a particular server. Even if the second instantiation of the browser application is not specifically configured to communicate with such a server, the second instantiation can still receive content from the server through the first instantiation of the browser application.

Figure 8:
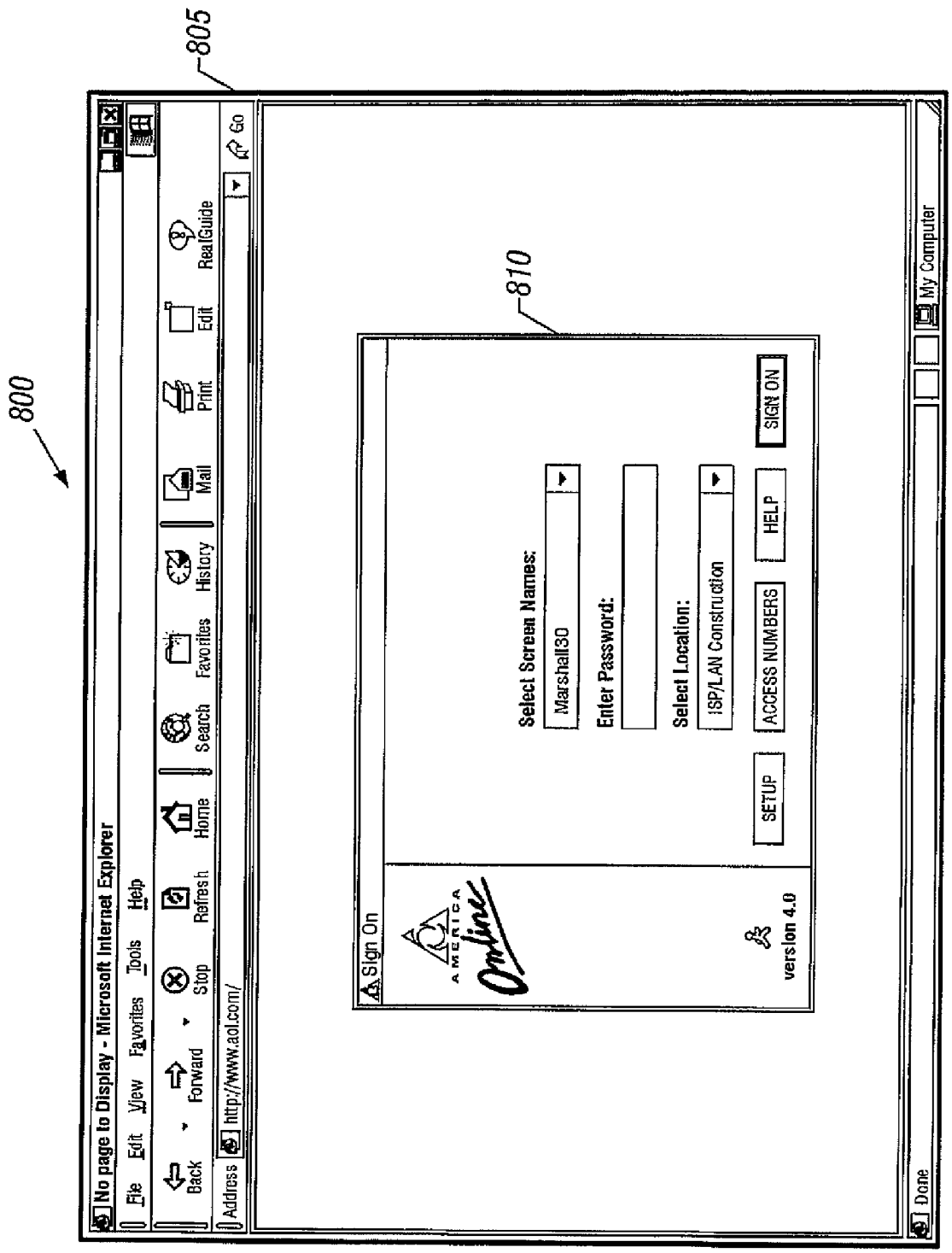
FIGS. 8-10 are illustrations of different graphical user interfaces that may be provided by the system of FIG. 1.

FIG. 8 illustrates a UI 800 that may be displayed to a user for obtaining access to the online services of an OSP. The UI 800 includes browser window 805 displaying an authorization box 810. In one implementation, the browser window 805 displays the authorization box 810 to a user when a browser navigates to a particular URL (e.g., http://www.aol.com). If the user enters a valid screen name and password into the authorization box 810, the OSP host grants access and provides online services.

Figure 9:
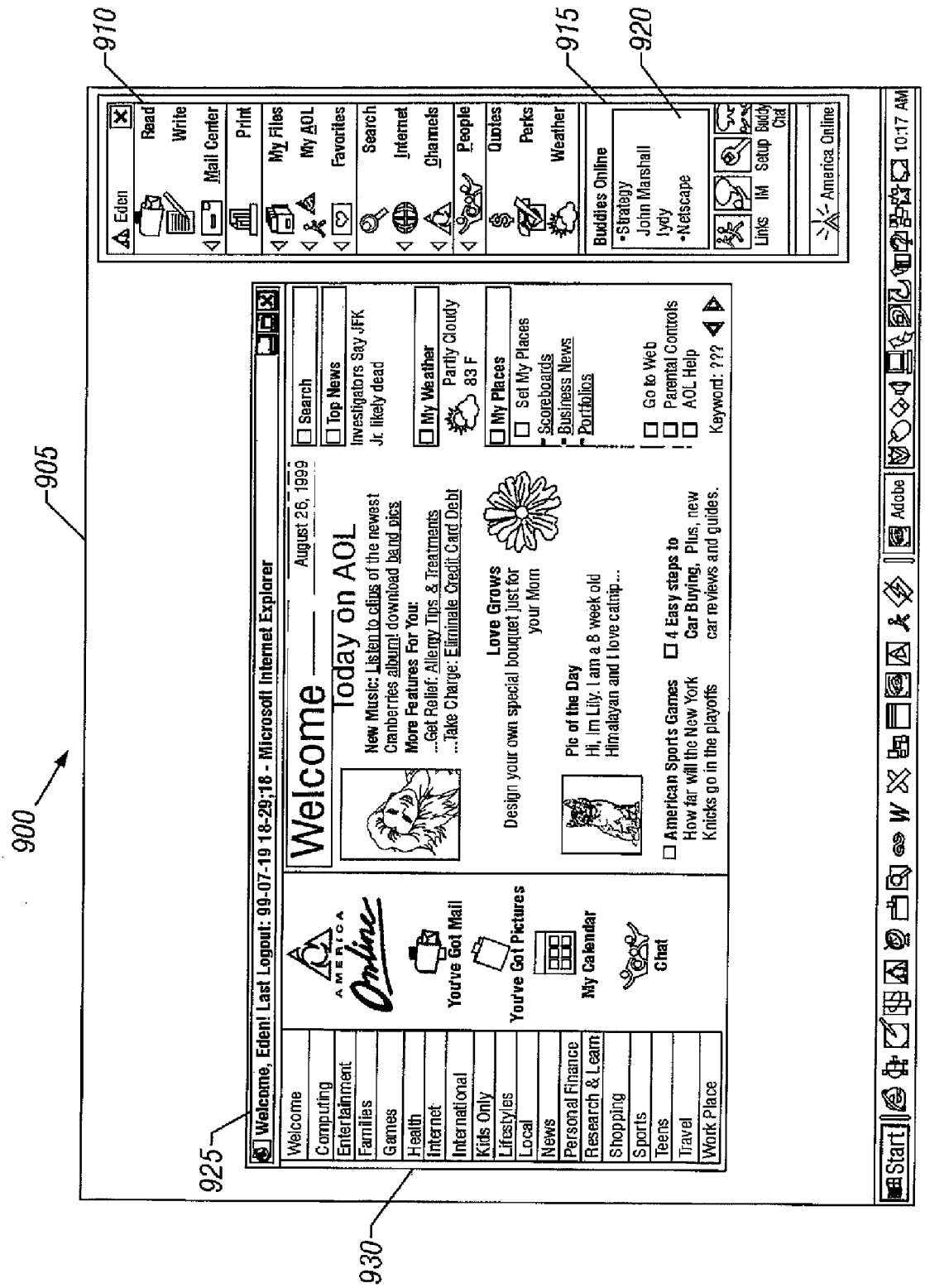

FIG. 9 illustrates a UI 900 that may be displayed to a subscriber after obtaining access to online services of an OSP. The UI 900 includes a desktop 905, a toolbar 910, an instant messaging window 915, and a Welcome screen 920. The desktop 905 serves as the background for instantiations of applications. In one implementation, the toolbar 910 includes the instant messaging window 915, and the toolbar 910 and the Welcome screen 920 are separate instantiations of the browser application displayed on the desktop 905. In other implementations, the toolbar 910 and the instant messaging window 915 each may be a separate instantiation of the browser application.

The toolbar 910 includes one or more icons. Selecting an icon may display a pop-up window or dialog box, may initiate a particular function, may directly link to an area of the online service or the Internet, or may display a pull-down menu having options related to the icon. To display the pull-down menu associated with the icon, a subscriber clicks the menu item button or simultaneously presses the ALT key and the underlined letter in the icon. The drop-down menus may include one or more cascading menus depending on the options related to the icon. A summary of the icons shown in the toolbar 910 will be given below. However, this summary is given by way of illustration and describes only one possible arrangement of icons.

The Read icon looks like a mailbox and displays a subscriber's new e-mail. The Write icon looks like a pad and pencil and displays a blank e-mail form for creating and sending an e-mail message. The Mail Center icon looks like a letter, and includes a drop-down menu with options to interact with an address book, mail controls, and Auto AOL (e.g., offline mail options). The Print icon looks like paper in a printer and prints a current file or screen. The My Files icon looks like a file drawer and includes a drop-down menu that includes a subscriber's Personal Filing Cabinet, Download Manager and Web Page, if one has been created. The My AOL icon looks like person carrying an AOL triangle and includes a drop-down menu with preferences, Buddy Lists, and functions that allow a subscriber to customize AOL based on the subscriber's unique needs. The Favorites icon looks like a folder with a heart on it and saves all the Favorite Places a subscriber registers while exploring AOL and the Internet. The Internet icon looks like a globe and includes a drop-down menu that includes the Internet, World Wide Web, FTP sites and Gopher, as well as AOL's NetFind search tool. The Channels icon looks like an AOL logo and includes a drop-down menu listing each AOL Channel for easy access. The People icon looks like a party and presents a drop-down menu including tools for a subscriber to communicate online such as, for example, Chat, AOL Live, Buddy Lists, IMs, and the Member Directory. The Quotes icon looks like a dollar sign ("$") and links a subscriber to an area for checking stock prices and/or obtaining other financial information. The weather icon looks like a sun and clouds and links the subscriber to an area for checking local, national, and/or global weather reports.

A subscriber can use the toolbar 910 to receive services of the OSP, including, for example, reading and writing e-mail messages, entering chat areas with other subscribers, or accessing the Internet. A subscriber also may customize the toolbar 910 to include links to the subscriber's favorite online places. As the subscriber navigates to different areas of the online service and the Internet, the subscriber will be presented different UIs. In general, however, the toolbar 910 will always be included in whatever UI is presented to the subscriber to allow constant access to the functions associated with the toolbar items. A subscriber can find out the function of each item in the toolbar by positioning a pointer over the icon or button for a few seconds to display a help message. To use the function described in the help text, a subscriber clicks the icon or button.

The UI 900 also includes an instant messaging window 915. The instant messaging window 915 may include an embedded instant messaging application for displaying a "buddy list" 920. In general, a subscriber's buddy list is a user interface that lists the online status and capabilities of certain screen names, i.e., "buddies," identified by the subscriber. In particular, the buddy list interfaces with the host to identify which buddies are online, i.e., currently accessing the host. The buddy list also facilitates instant messaging communication between subscribers. A subscriber can activate an instant messaging message window pre-addressed to a buddy simply by clicking the screen name of a buddy on the buddy list. Otherwise, the subscriber must activate and address a blank instant messaging window. When necessary, a subscriber can look up the screen name of an intended recipient using the intended recipient's e-mail address or other identifying information.

The UI 900 also includes a Welcome screen 925 that may display OSP content (e.g., news, weather, entertainment, advertising) and links to areas within the OSP host complex and the Internet. The Welcome screen 925 may include a channel bar 930 and/or other icons for accessing high volume areas frequently visited by subscribers.

Figure 10:
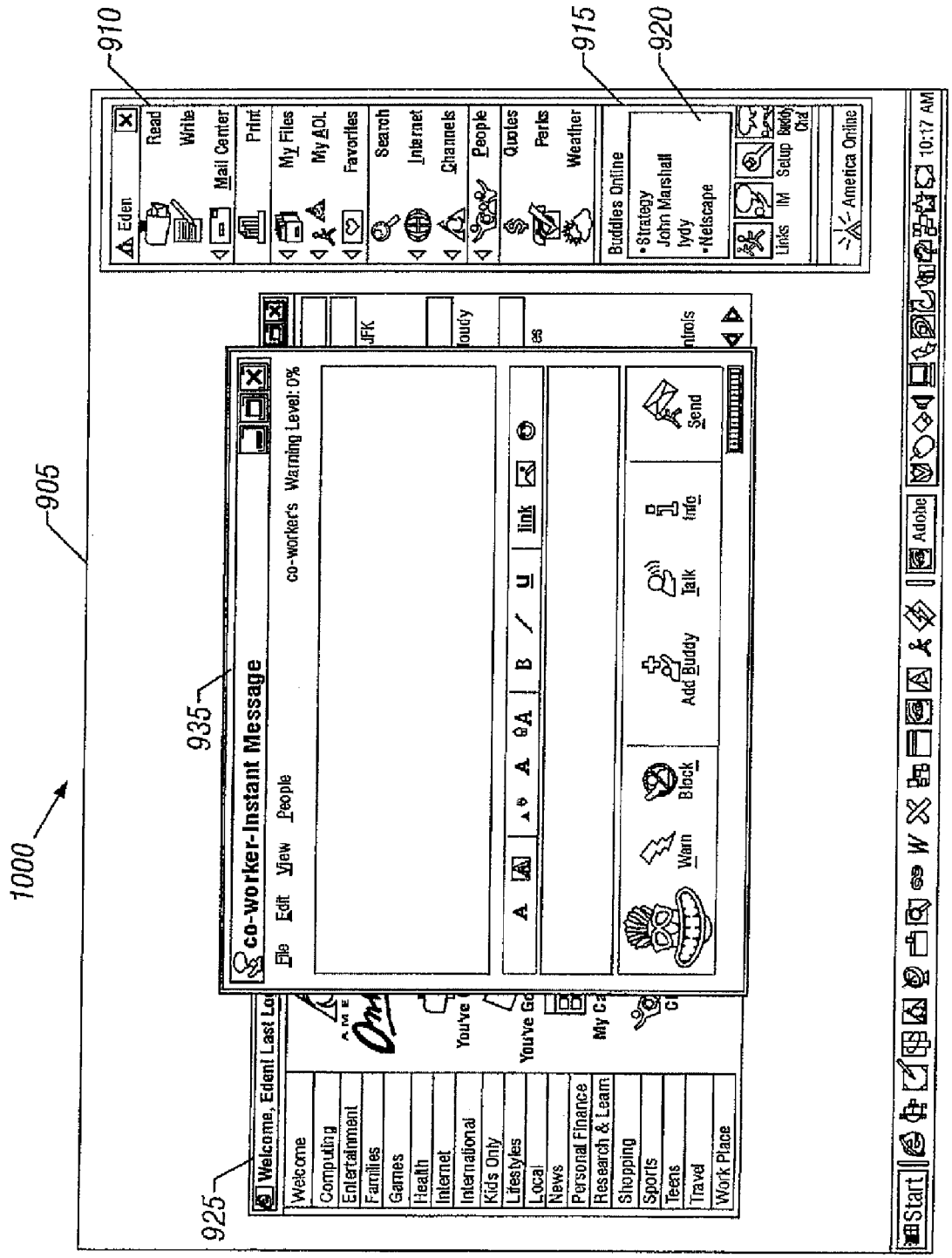

FIG. 10 illustrates a UI 1000 that may be displayed to a subscriber for sending an instant message. In addition to the desktop 905, the toolbar 910, the instant messaging window 915, and the Welcome screen 925, described above with reference to FIG. 9, the UI 1000 includes an IM message window 935. A subscriber may activate the IM message window 935 by clicking the screen name "co-worker" in the buddy list 920 of the instant message window 915. The toolbar 910 may include the instant messaging window 915. Each of the toolbar 910, the Welcome screen 925, and the IM message window 935 may be a separate instantiation of the browser application displayed on the desktop 905. The toolbar 910 and the instant messaging window 915 also may be separate instantiations of the browser application.

In one implementation, the toolbar 910 includes the instant messaging window 915. The toolbar 910 is a first instantiation of the browser application, the IM message window 935 is a second instantiation of the browser application, and the instant messaging window 915 includes an embedded instant messaging application.

A user may interface with the second instantiation of the browser application, i.e., the IM message window 935, to compose and send an instant message. When the user sends the instant message by clicking a send button, for example, the message is communicated over a communication pathway to the first instantiation of the browser application, i.e., the toolbar 910. Using the embedded instant messaging application in the instant messaging window 915, the toolbar 910 interacts with an IM server residing on an IM host complex. Typically, the IM server is configured to engage in communication sessions only with the instant messaging application. In this case, however, the first instantiation of the browser application including the embedded instant messaging client acts as a proxy on the client and enables the communication session to occur. To the instant messaging server, interaction is occurring with the instant messaging application rather than a standard Internet browser application. During the communication session, i.e., the instant messaging session, the toolbar 910 manages the session and the IM message window 935 displays session content.

The foregoing description and examples are intended to illustrate and not limit the scope of the invention, which is defined by the appended claims. In particular, the application environment may be supported by a browser application embedded in an OSP client application. Moreover, the number of instantiations of the browser application that may be simultaneously running and communicating with each other is in no way limited by available display space. There also is no restriction on the protocol for delivery, the type of the delivery mechanism, and/or the operating system (e.g., Windows, UNIX, LINUX) used to implementing aspects of the present invention.

Other implementations are within the scope of the following claim.

What is claimed is:

1. A communications method for transferring electronic data, the method comprising:
   establishing a connection between a client and a host, the client including a browser application configured to render data written in Hyper-Text Markup Language (HTML);
   transmitting a data request from the client to the host;
   receiving electronic data from the host in response to the data request transmitted from the client;
   at the client, executing a first opening of the browser application in response to the electronic data received from the host by launching the browser application a first time; and
   at the client, executing a second opening of the browser application by launching the browser application a second time,
   wherein the first opening of the browser application is configured to directly exchange messages with the second opening of the browser application at the client system, and
   wherein each of the first and second openings of the browser application is configured to render data written in HTML.

2. The communications method of claim 1, wherein the first opening of the browser application being configured to directly exchange messages with the second opening of the browser application comprises the first opening of the browser application being configured to exchange messages with the second opening of the browser application through a communications pathway between the first opening of the browser application and the second opening of the browser application, the communications pathway being established and located entirely at the client.

3. The communications method of claim 1 further comprising rendering a first graphical user interface within the first opening of the browser application and rendering a second graphical user interface within the second opening of the browser application.

4. The communication method of claim 1 further comprising establishing the communication pathway between the first and second openings of the browser application by executing coordinating code in the first opening of the browser application and in the second opening of the browser application.

5. The communications method of claim 4 wherein the coordinating code is written in a standard Internet content format.

6. The communications method of claim 1 further comprising establishing a communications session in the first opening of the browser application.

7. The communications method of claim 6 further comprising controlling the communications session in the first opening of the browser application.

8. The communications method of claim 7 further comprising displaying content associated with the session in a second opening of the browser application.

9. The communications method of claim 1 wherein the data request is transmitted using an OSP client application.

10. The communications method of claim 1 wherein the data request is transmitted using the browser application.

11. The communications method of claim 1 wherein the browser application is embedded within an OSP client application.

12. The communications method of claim 1 wherein the first opening of the browser application comprises a welcome screen.

13. The communications method of claim 1 wherein the first opening of the browser application comprises a toolbar.

14. The communications method of claim 1 wherein the first opening of the browser application comprises an electronic mail window.

15. The communications method of claim 1 wherein the first opening of the browser application comprises an instant messaging window.

16. The communications method of claim 1 wherein the first opening of the browser application comprises a search window.

17. The communications method of claim 1 wherein the messages exchanged between the first opening of the browser application and the second opening of the browser application include state information.

18. The communications method of claim 1 wherein the messages exchanged between the first opening of the browser application and the second opening of the browser application include session content.

19. The communications method of claim 1 wherein the messages exchanged between openings of the browser application include communications parameters for maintaining a connection between openings of the browser application.

20. The communications method of claim 1 wherein the first opening of the browser application is dedicated to providing a first type of online service and the second opening of the browser application is dedicated to providing a second and different type of online service.

21. The communications method of claim 20 wherein the first type of online service is an OSP service and the second type of online service is an instant messaging service.

22. The communications method of claim 1 wherein the first opening of the browser application is configured to receive content from the second opening of the browser application, the content being stored on a server that is not otherwise configured to communicate with the first opening of the browser application.

23. The communications method of claim 22 wherein the first opening of the browser application is configured for email, the second opening of the browser application is configured for instant messaging, and the server is an instant messaging server.

24. The communications method of claim 1, further comprising the first opening of the browser application:
receiving content request messages directly from the second opening of the browser application through a communications pathway entirely located within the client, and
communicating the content request messages to the host.

25. The communications method of claim 24, further comprising the first opening of the browser application:
receiving content from the host in response to the content request messages, and
delivering, through the communications pathway, the content to the second opening of the browser application that sent the content request messages.

26. The communications method of claim 1, wherein executing a first opening of the browser application comprises executing a first multi-windowed opening of the browser application and executing a second opening of the browser application comprises executing a second multi-windowed opening of the browser application.

27. The communications method of claim 1, wherein executing a first opening of the browser application comprises executing a first single-windowed opening of the browser application and executing a second opening of the browser application comprises executing a second single-windowed opening of the browser application.

28. The communications method of claim 1. wherein the messages include data received from the host.

29. A computer program for transferring electronic data, the computer program being stored on a tangible computer readable medium and comprising instructions for:
establishing a connection between a client and a host, the client including a browser application configured to render data written in Hyper-Text Markup Language (HTML);
transmitting a data request from the client to the host;
receiving electronic data from the host in response to the data request transmitted from the client;
at the client, executing a first opening of the browser application in response to the electronic data deceived from the host by launching the browser application a first time; and
at the client, executing a second opening of the browser application by launching the browser application a second time,
wherein the first opening of the browser application is configured to directly exchange messages with the second opening of the browser application at the client system, and
wherein each of the first and second openings of the browser application is configured to render data written in HTML.

30. The computer program of claim 29, wherein the first opening of the browser application being configured to directly exchange messages with the second opening of the browser application comprises the first opening of the browser application being configured to exchange messages with the second opening of the browser application through a communications pathway between the first opening of the browser application and the second opening of the browser application, the communications pathway being established and located entirely at the client.

31. A communications method for transferring electronic data, the method comprising:
   establishing a connection between a client and a host, the client including a browser application configured to render data written in HTML; and
   transmitting electronic data from the host in response to a data request received from the client,
   wherein the electronic data comprise instructions for executing a first opening of the browser application by launching the browser application a first time and instructions for executing a second opening of the browser application by launching the application a second time, the first opening of the browser application being configured to directly exchange messages with the second opening ot the browser application at the client system, and
   wherein each of the first and second openings of the browser application is configured to render data written in HTML.

32. The communications method of claim 31, wherein the first opening of the browser application being configured to directly exchange messages with the second opening of the browser application comprises the first opening of the browser application being configured to exchange messages with the second opening of the browser application through a communications pathway between the first opening of the browser application and the second opening of the browser application, the communications pathway being established and located entirely at the client.

33. The communications method of claim 31, wherein the first opening of the browser application comprises a first multi-windowed opening of the browser application and the second opening of the browser application comprises a second multi-windowed opening of the browser application.

34. The communications method of claim 31, wherein the first opening of the browser application comprises a first single-windowed opening of the browser application and the second opening of the browser application comprises a second single-windowed opening of the browser application.

35. The communications method of claim 31, wherein the messages include data received from the host.

36. A computer program for transferring electronic data, the computer program being stored on a tangible computer readable medium and comprising instructions for:
   establishing a connection between a client and a host, the client including a browser application configured to render data written in HTML; and
   transmitting electronic data from the host in response to a data request received from the client,
   wherein the electronic data comprise instructions for executing a first opening of the browser application by launching the browser application a first time and instructions for executing a second opening of the browser application by launching the application a second time, the first opening of the browser application being configured to directly exchange messages with the second opening of the browser application at the client system, and
   wherein each of the first and second openings of the browser application is configured to render data written in HTML 37. The computer program of claim 36, wherein the first opening of the browser application being configured to directly exchange messages with the second opening of the browser application comprises the first opening of the browser application being configured to exchange messages with the second opening of the browser application through a communications pathway between the first opening of the browser application and the second opening of the browser application, the communications pathway being established and located entirely at the client.

* * * * *